(12) United States Patent
Moertl et al.

(10) Patent No.: US 6,418,503 B1
(45) Date of Patent: Jul. 9, 2002

(54) BUFFER RE-ORDERING SYSTEM

(75) Inventors: Daniel Frank Moertl, Rochester, MN (US); Danny Marvin Neal, Round Rock; Steven Mark Thurber, Austin, both of TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,633

(22) Filed: Aug. 19, 1999

(51) Int. Cl.[7] .............................................. G06F 13/10
(52) U.S. Cl. ........................ 710/310; 710/52; 710/53; 710/55; 710/57
(58) Field of Search ............................... 710/52, 53, 55, 710/57, 310

(56) References Cited

U.S. PATENT DOCUMENTS 5,872,941 A * 2/1999 Goodrum et al. ............ 370/401
6,219,737 B1 * 4/2001 Chen et al. .................. 710/107
6,260,095 B1 * 7/2001 Goodrum ..................... 710/22

* cited by examiner

Primary Examiner—Hiep T. Nguyen
(74) Attorney, Agent, or Firm—Robert V. Wilder; Mark E. McBurney

(57) ABSTRACT

A method and implementing system is provided in which multiple nodes of a PCI bridge/router circuit are connected to corresponding plurality of PCI busses to enable an extended number of PCI adapters to be connected within a computer system. Multiple enhanced arbiters are implemented to enable non-blocking and deadlock-free operation while still complying with PCI system requirements. An exemplary PCI-to-PCI router (PPR) circuit includes the arbiters as well as PPR buffers for temporarily storing transaction-related information passing through the router circuit between adapters on the PCI busses and/or between PCI adapters and the CPUs and system memory or other system devices. A buffer re-naming methodology is implemented to eliminate internal request/completion transaction information transfers between bridge buffers thereby increasing system performance. Transaction ordering rules are also implemented along with the arbiters to enable optimal information transfer management through the buffers, and routing tables are used to enable the addressing of all of the adapters on the plurality of PCI busses, and the efficient parallel peer-to-peer and IOP transfer of information between the adapter devices and also between the system and adapter devices on the PCI busses.

26 Claims, 14 Drawing Sheets

| BUFFER A | BUFFER B | ACTION IF NEW COMMAND RECEIVED | REORDER BUFFERS |
|---|---|---|---|
| FREE | FREE | ALLOW ANY | N.A. |
| FREE | PMWx | ALLOW ANY TO NODE X, RETRY OTHERS (7) | N.A. |
| FREE | DRC-PRE | ALLOW ANY | N.A., 5, 6 |
| FREE | DRC-NPRE | ONLY ALLOW PMW, RETRY OTHERS | N.A., 5, 6 |
| FREE | DWC | ONLY ALLOW PMW, RETRY OTHERS | N.A., 6 |
| FREE | DRR | ONLY ALLOW PMW, RETRY OTHERS (8) | N.A. |
| FREE | DWR | ONLY ALLOW PMW, RETRY OTHERS | N.A. |
| PMW | PMW | RETRY | NO |
| PMW | DRC-PRE | RETRY | 1, 5, 6 |
| PMW | DRC-NPRE | RETRY | 1, 5, 6 |
| PMW | DWC | RETRY | 1, 6 |
| PMW | DRR | RETRY | 3 |
| PMW | DWR | RETRY | 3 |
| DRC-PRE | DRC-PRE | ALLOW ONLY PMW, (4) | 2, 5, 6 |
| DRC-PRE | DRC-NPRE | ALLOW ONLY PMW, (4) | 2, 5, 6 |
| DRC-PRE | DWC | ALLOW ONLY PMW, (4) | 1, 5, 6 |
| DRC-PRE | DRR | ALLOW ONLY PMW, (4) | 1, 5, 6 |
| DRC-PRE | DWR | ALLOW ONLY PMW, (4) | 1, 5, 6 |
| PMWx | FREE | ALLOW ANY TO NODE X, RETRY OTHERS (7) | N.A. |
| DRC-PRE | FREE | ALLOW ANY | N.A., 5, 6 |
| DRC-NPRE | FREE | ONLY ALLOW PMW, RETRY OTHERS | N.A., 5, 6 |
| DWC | FREE | ONLY ALLOW PMW, RETRY OTHERS | N.A., 6 |
| DRR | FREE | ONLY ALLOW PMW, RETRY OTHERS (8) | N.A. |
| DWR | FREE | ONLY ALLOW PMW, RETRY OTHERS | N.A. |
| DRC-PRE | PMW | RETRY | 1, 5, 6 |
| DRC-NPRE | PMW | RETRY | 1, 5, 6 |
| DWC | PMW | RETRY | 1, 6 |
| DRR | PMW | RETRY | 3 |
| DWR | PMW | RETRY | 3 |
| DRC-NPRE | DRC-PRE | ALLOW ONLY PMW, (4) | 2, 5, 6 |
| DWC | DRC-PRE | ALLOW ONLY PMW, (4) | 2, 5, 6 |
| DRR | DRC-PRE | ALLOW ONLY PMW, (4) | 1, 5, 6 |
| DWR | DRC-PRE | ALLOW ONLY PMW, (4) | 1, 5, 6 |

BUFFER RE-ORDERING SYSTEM

RELATED APPLICATIONS

Subject matter disclosed and not claimed herein is disclosed and claimed in co-pending application entitled "Multiple Bus Arbiter System", Ser. No. 09/377,638, "Multi-Node PCI-to-PCI Bridge", Ser. No. 09/377,635, and "Transaction Routing System", Ser. No. 09/377,634, which are filed on even date herewith and assigned to the assignee of the present application.

FIELD OF THE INVENTION

The present invention relates generally to information processing systems and more particularly to an improved information transfer system in a computer related environment.

BACKGROUND OF THE INVENTION

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds and bandwidths. As new applications for computers are implemented, new programs are developed and those programs are enriched with new capabilities almost on a daily basis. While such rapid development is highly desirable, there is a capability cost in terms of system speed and bandwidth.

As used herein, the term "bandwidth" is used generally to refer to the amount of information that can be transferred in a given period of time. In transferring information between devices in a computer system, information is frequently temporarily stored in "holding" buffers along the path of the information transfer. Such buffers include bridge buffers which are generally located in bridge circuits connecting devices or busses between which the information is to be transferred. In one example, peripheral component interconnect or "PCI" system bridge circuit buffers are assigned to PCI devices, which are installed in PCI "slots" and coupled to an associated PCI bus. Complex computer systems may include many bridge circuits connected between individual PCI busses or connecting a PCI bus to a system bus. In a PCI system, any of the computer system enhancement devices or adapters are generally included on one or more circuit boards which are mounted or inserted into PCI "slots", i.e. into board connector terminals mounted on a system motherboard.

Standard PCI-PCI bridges are utilized in the industry today as a means to provide added slots for PCI devices since individual PCI busses are limited to 10 loads per bus at 33 MHz and 5 loads at 66 MHz (a soldered device counts as one load and a slotted device counts as two loads). This requires a combination of multiple PCI host bridges and/or multiple standard PCI-PCI bridges per each server drawer where server drawers typically house 14–16 PCI slots per drawer. The total integrated circuit (IC) or chip and packaging cost is expensive utilizing standard components.

Thus, there is an increasing need for an improved computer system which is designed to be able to efficiently handle greater numbers of peripheral adapters in computer systems.

SUMMARY OF THE INVENTION

A method and implementing system is provided in which multiple PCI busses are managed through a combination multiple node PCI-to-PCI bridge including a non-blocking PCI Router (PCIR) circuit. Bridge buffer re-order rules are defined to establish when buffers are re-ordered such that subsequent transactions are allowed to be attempted ahead of transactions already present in the buffer at a particular node. Other buffer management and transaction ordering rules are defined to meet PCI ordering requirements and also to allow peer-to-peer and I/O Processor (IOP) traffic between multiple secondary nodes in a non-blocking manner.

BRIEF DESCRIPTION OF THE DRAWINGS

A better understanding of the present invention can be obtained when the following detailed description of a preferred embodiment is considered in conjunction with the following drawings, in which:

FIG. 6 is an illustration of a re-ordering table implemented in the exemplary PPB;

DETAILED DESCRIPTION

The various methods discussed herein may be implemented within a typical computer system which may include a server, workstation, or personal computer. In general, an implementing computer system may include a plurality of processors in a multi-bus system within a network of similar systems. However, since the workstation or computer system in which the present invention may be implemented is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

As hereinafter explained in detail, the disclosed methodology is effective in connection with an exemplary PCI bus system which utilizes effective posted memory write transactions and delayed read and delayed write transactions. PCI ordering rules require that read transactions "push" previous write transactions ahead of them. In the case of delayed transactions for PCI, the master that initiates the request must get back on the bus and repeat the original request again and again until the transaction completes. With reference to the disclosed embodiment, it is noted that while a PCI computer system is illustrated, the present invention is also applicable to other information processing systems in which data is transferred between a plurality of "holding" or "in-transit" storage locations in an extended processing or communication system.

In the exemplary PCI system illustrated, each of a plurality of PCI busses is connected to a PCI-to-PCI Router circuit (hereinafter "PPR") which, in turn, is connected to the next higher level bus in the system. Each PCI bus in a system may have a number of slots. The actual number of slots allowable for adapters connected to the PCI bus is dependent on the intended operating frequency and mode of operation (PCI or PCIX mode). Each PPR circuit in the system includes a number of buffers for use in temporarily storing information transferred to and from the corresponding assigned devices installed in the PCI slots of the PCI busses as well as to other devices in the system.

Figure 1:
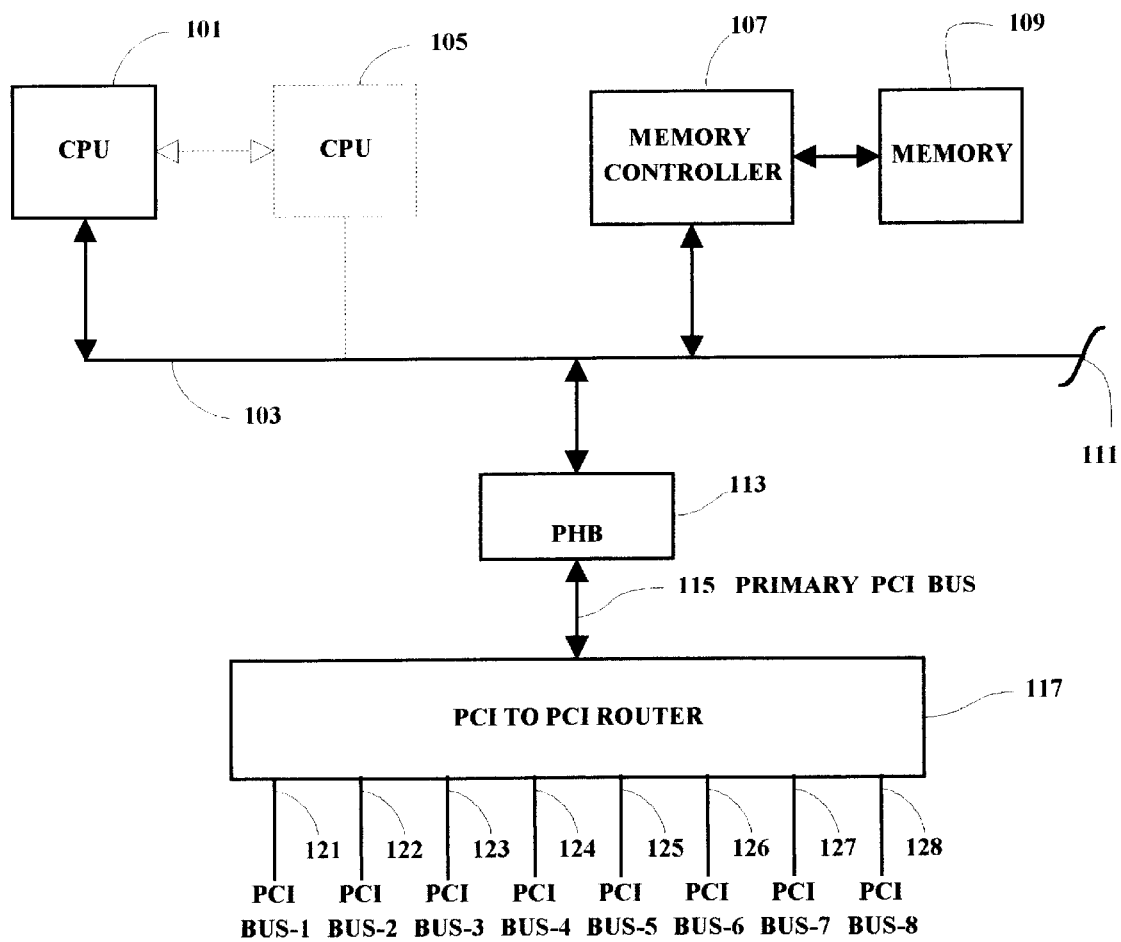
FIG. 1 is a diagram of an exemplary computer system in which the present invention is implemented.

For example, in FIG. 1, an exemplary PCI system includes one or more CPUs 101, 105, which are connected to a system bus 103. A memory controller 107 and memory unit 109 are also connected to the system bus 103. The bus 103 is extended 111 for further system connections to other system devices and networks which are known in the art but are not specifically illustrated in order not to obfuscate the drawings and distract from the disclosure of the present invention.

The system bus 103 is also coupled through a PCI Host Bridge (PHB) circuit 113 to a first or primary PCI bus 115. The system may also include additional PCI Host bridge circuits (not shown). The primary PCI bus 115 is coupled to a PPR or router circuit 117 which is connected to a plurality of secondary nodes to corresponding PCI busses 121–128. In the exemplary embodiment illustrated, eight PCI busses 121–128 are shown although there may be more or fewer busses implemented in any given system. It is noted that only one PHB 113 is illustrated in the present example although the invention also applies to other configurations which may include additional PHB and PPR circuits, and extended PCI bus arrangements as well.

The exemplary embodiment includes support for processor load/store operations from processors to PCI I/O memory space, I/O space, and configuration space, and support for peer-to-peer transactions between PCI bus nodes and I/O-Processor (IOP) support. An arbiter for the primary bus may be included in the PHB 113 such that the PPR 117 has one REQ-0/GNT-0 pair of signal lines for requesting and granting access to the primary bus 115 from the PPR 117. The PPR 117 also includes an internal arbiter for the primary bus interface of the PPR to determine which of the eight secondary nodes in the example, will gain access to the primary bus, i.e. to drive and receive the primary REQ-0/GNT-0 pair. When multiple nodes i.e. more than one of the PCI busses 1–8, have pending transactions for the primary PCI bus 115, an internal fairness methodology is implemented as hereinafter explained, to avoid deadlocks and provide fair access to the primary bus by each secondary PCI node of the PPR 117. In the example, a simple round-robin approach is implemented.

For processor load/store support, peer-to-peer access and IOP support, pending transactions which are buffered at the various PPR nodes which are targeting other PPR nodes, must arbitrate for the respective PPR nodes which the transactions target.

In the case of a single attached PCI device at each of the secondary PCI nodes 121–128, an internal arbiter is provided for each PCI secondary node. An internal REQ#/GNT# pair is provided to each secondary node, for each source node to arbitrate for a respective target node. An external REQ#/GNT# pair is provided on each secondary PCI bus for the attached device at the node to also arbitrate for that respective PCI bus. An internal fairness arbitration methodology is implemented for each arbiter at each PCI secondary bus. The exemplary arbitration methodology uses a round-robin approach to determine which internal request from another node will be next to request access for a specific secondary PCI bus. Further, the preferred methodology gives priority to the externally attached device when it is requesting the bus. For example, when both internal requests and the attached adapter at a specific node are all requesting the PCI bus at that node, the arbiter will alternate between the externally attached PCI device at that node and internal requests. In this manner, if a secondary node is busy with traffic from an attached PCI device at node "X" plus multiple peer-to-peer traffic and host traffic is targeting node "X", the externally attached device at node "X" would get approximately 50% of node "X" PCI bus bandwidth, while the peer-to-peer and host traffic targeting node "X" would share the other approximately 50% of node "X" bus bandwidth. Internal routing tables as hereinafter described, determine the target node of buffered transactions.

For the case of multiple attached PCI devices at some or all of the secondary PCI nodes, an external arbiter is provided for each PCI secondary node which has multiple externally attached devices. For this case the PPR or router 117 provides a second REQ#/GNT# pair which the PPR drives and receives, respectively, to route to an external arbiter. In this case the internal fairness arbiter at each PPR secondary node determines which internal request gets a turn to request the specific node PCI bus, and routes the request to the external arbiter. The external arbiter then determines when the internal requests and when the externally attached PCI devices get their turns on that PCI bus. Both the internal and external arbiters must rotate taking turns between internal requests and between external devices requesting the PCI bus at each node, otherwise deadlocks can occur.

For a standard PCI-to-PCI bridge, only a single secondary bus arbiter is required to accommodate requests from externally attached PCI devices and the PCI-to-PCI bridge's own outbound (away from processor) requests for use of the secondary bus. For a PCI-to-PCI router type of combination bridge/router, multiple internal enhanced arbiters ("n" nodes equal "n" internal bus arbiters) are required to handle requests for use of the PCI bus at each node, while co-operatively interacting with any external arbiters on those busses for supporting device requests from externally attached PCI devices, outbound host (from primary bus) requests, plus peer-to-peer or IOP node requests.

Figure 2:
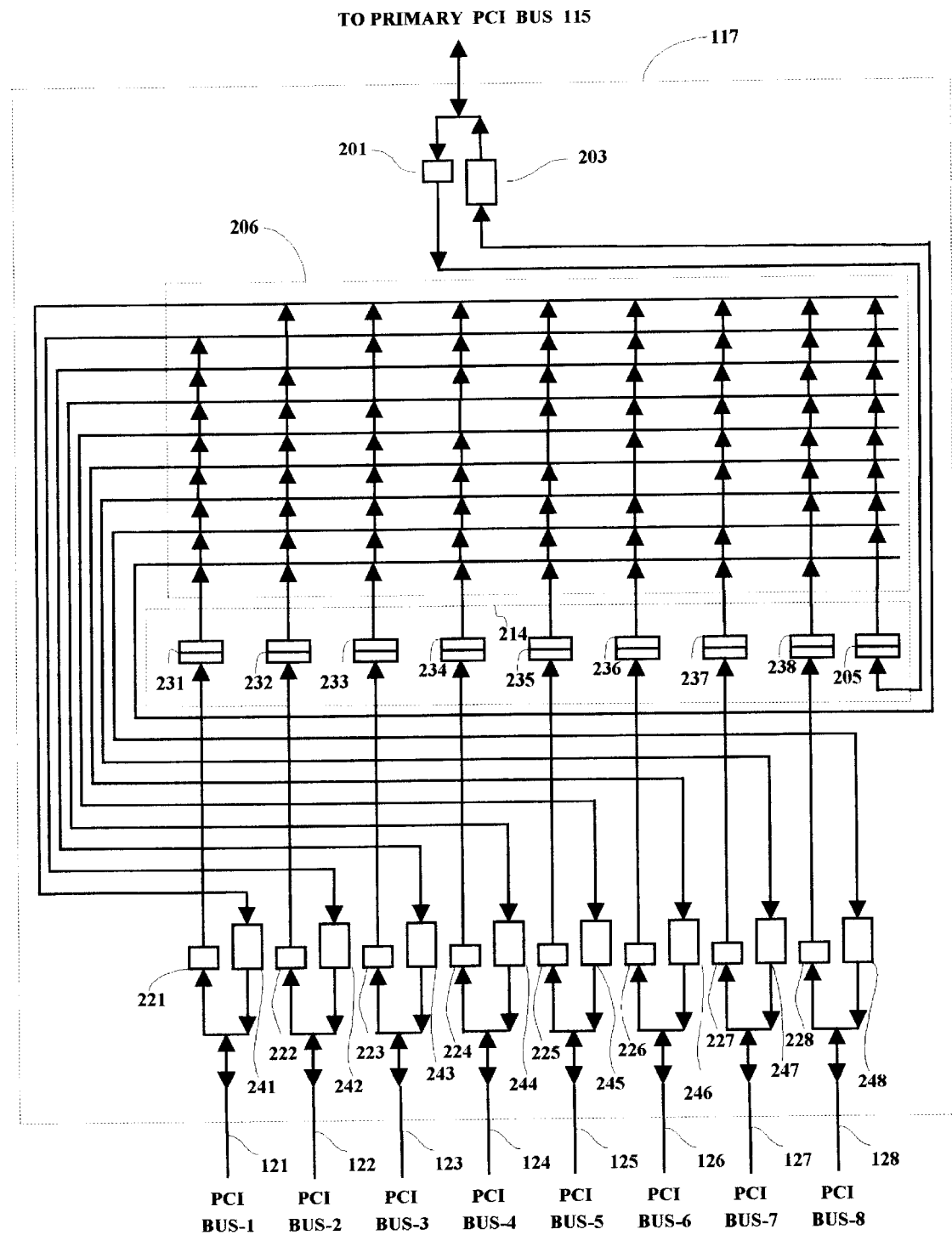
FIG. 2 is a schematic diagram illustrating several key components utilized in an exemplary implementation of the bridge and router system of the present invention.

In FIG. 2, there is shown an exemplary PPR circuit 117 including several of the key components of the router. As illustrated, the PPR 117 includes a primary target function device 201 and a primary master function device 203 which are both coupled to the primary PCI bus 115. The primary target function device 201 acts to transmit target-destined information from above the PPR 117 to designated target devices through a buffer pair 205 located within the PPR 117. An output from the buffer pair 205 is sent to a routing control circuit 206 which is shown schematically in FIG. 2. The primary master function device 203 is arranged to provide an output from the PPR 117 to the primary PCI bus 115 in the illustrated example. The primary master device 203 is also coupled to the routing control circuit 206. A buffer arrangement 214 within the PPR 117 includes buffer pair 205 and eight additional pairs of buffers 231–238, respectively, for temporarily storing information being transferred to and from and between PCI devices connected in the slots of PCI busses 121–128. The first buffer pair 205 couples the PPR primary target function 201 to the routing control circuit 206. The eight remaining buffer pairs 231–238 are connected between outputs of eight secondary target function devices 221–228 and the routing control circuit 206. The inputs to the eight secondary target function devices 221–228 are connected to respective ones of the eight PCI busses 121–128, respectively. Eight secondary master function devices 241–248, respectively, are connected between the eight PCI busses 121–128 and corresponding nodes of the routing control circuit 206.

As illustrated in FIG. 2, the exemplary embodiment includes two buffers per node with up to nine nodes total. It is noted that the numbers of buffers per node, total nodes and bytes per buffer used in the illustrated example have been chosen for purposes of ease of explanation and the actual numbers may vary from those in the exemplary embodiment. As hereinafter referred to, Node "0" is the primary PCI node connection to the primary PCI bus 115, and Nodes 1–8 are the secondary PCI nodes connected to secondary PCI busses 121–128. The primary node includes 64 bytes per buffer, while the secondary nodes include 512 bytes per buffer in the exemplary embodiment.

Figure 3:
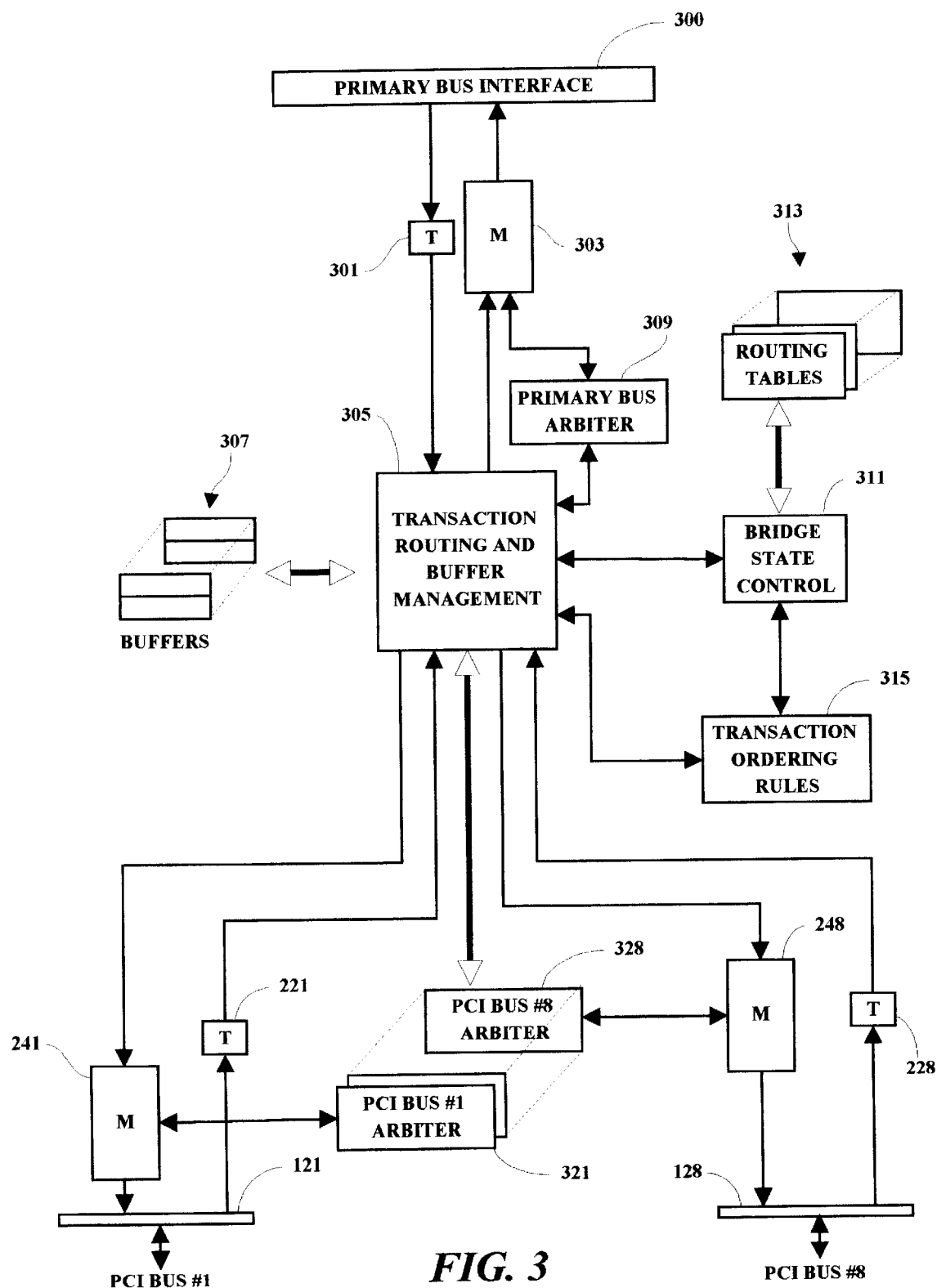
FIG. 3 is an overall system schematic illustration useful in explaining an exemplary operation of the present invention.

FIG. 3 shows a functional block diagram of the PPR circuit. As illustrated, a primary bus interface 300 is connected to both a primary target function 301 and a primary master function 303. The master function 303 is connected to a transaction routing and buffer management control 305 and a primary bus arbiter 309. The primary bus arbiter 309 functions to determine which one of a plurality of requests from the secondary side of the PPR for access to the primary bus is granted at any given time. The transaction routing and buffer management function 305 controls and manages the routing of the information requests and completions through the PPR buffers 307 in accordance with routing tables 313, bridge state control input 311 and transaction ordering rules 315. The transaction routing and buffer management function 305 is also coupled to eight secondary nodes in the example. The first secondary node 121 which is coupled to the first PCI bus, is connected through master and target function devices 241 and 221, respectively, to the buffer management block 305. Similarly, all of the secondary nodes are likewise connected through associated master and target function devices to the buffer management block 305. For example, node 128 is connected through associated master device 248 and an associated target device 228 to the management block 305. Further, each secondary node 121–128 is coupled to associated arbiters 321–328 to the buffer block 305. The arbiters 321–328 are designed to independently determine which of a plurality of requests for access to each of a plurality of secondary busses 1–8 is granted at any given time in a non-blocking manner.

In an exemplary operation, a peer-to-peer request from an adapter on PCI bus #1 to an adapter on PCI bus #8, would flow first through the target function 221 (after that adapter on PCI bus #1 won access to the bus) to a buffer 307 at node #1. Later, that request stored in buffer 307 at node #1 will be routed through Routing Tables 313 and PCI bus #8 Arbiter 328 and Master function 248 out to an adapter target on PCI bus #8.

PCI-to-PCI bridges which are compliant with PCI Standard 2.2 (PCI Local Bus Specification, Revision 2.2, published on Dec. 18, 1998 and included herein by reference), support delayed transactions and therefore provide transaction buffering through the bridge for both posted memory write transactions (PMW) and delayed transactions. Delayed transactions include delayed read requests (DRR), delayed write requests (DWR), delayed read completions (DRC) and delayed write completions (DWC). Typically, PCI-PCI bridges organize transaction buffers such that there is a separate set of buffers for the "inbound" path toward the processor/memory complex, and a separate set of buffers for the "outbound" path away from the processor/memory complex. Both inbound and outbound paths can contain a mix of any of the transaction types listed above.

In a standard PCI-PCI bridge, there are typically separate transaction request buffers and separate transaction completion buffers, for both inbound and outbound paths. When an inbound delayed request in the inbound transaction buffer path completes on the primary bus, the transaction is designated as a delayed completion and is placed in a buffer in the outbound transaction buffer path and the inbound buffer that contained the request is then freed-up to receive other requests. The delayed completion will remain in the buffer in the outbound transaction buffer path and await the originating master on the secondary bus to try the transaction again. Similarly, in a standard PCI-PCI bridge, when an outbound delayed request in the outbound transaction buffer completes on the secondary bus, the transaction is converted to a delayed completion and is placed in a buffer in the inbound transaction buffer path thereby freeing-up an outbound buffer. The delayed completion will remain in the inbound transaction buffer path where it awaits the originating master on the primary bus to try the transaction again. Thus, in the past, two bridge buffers were generally used for a request/completion transaction, and processing time was required for writing in completion information into one buffer in one direction and erasing or invalidating the associated request information from a different buffer in the other direction.

Figure 4:
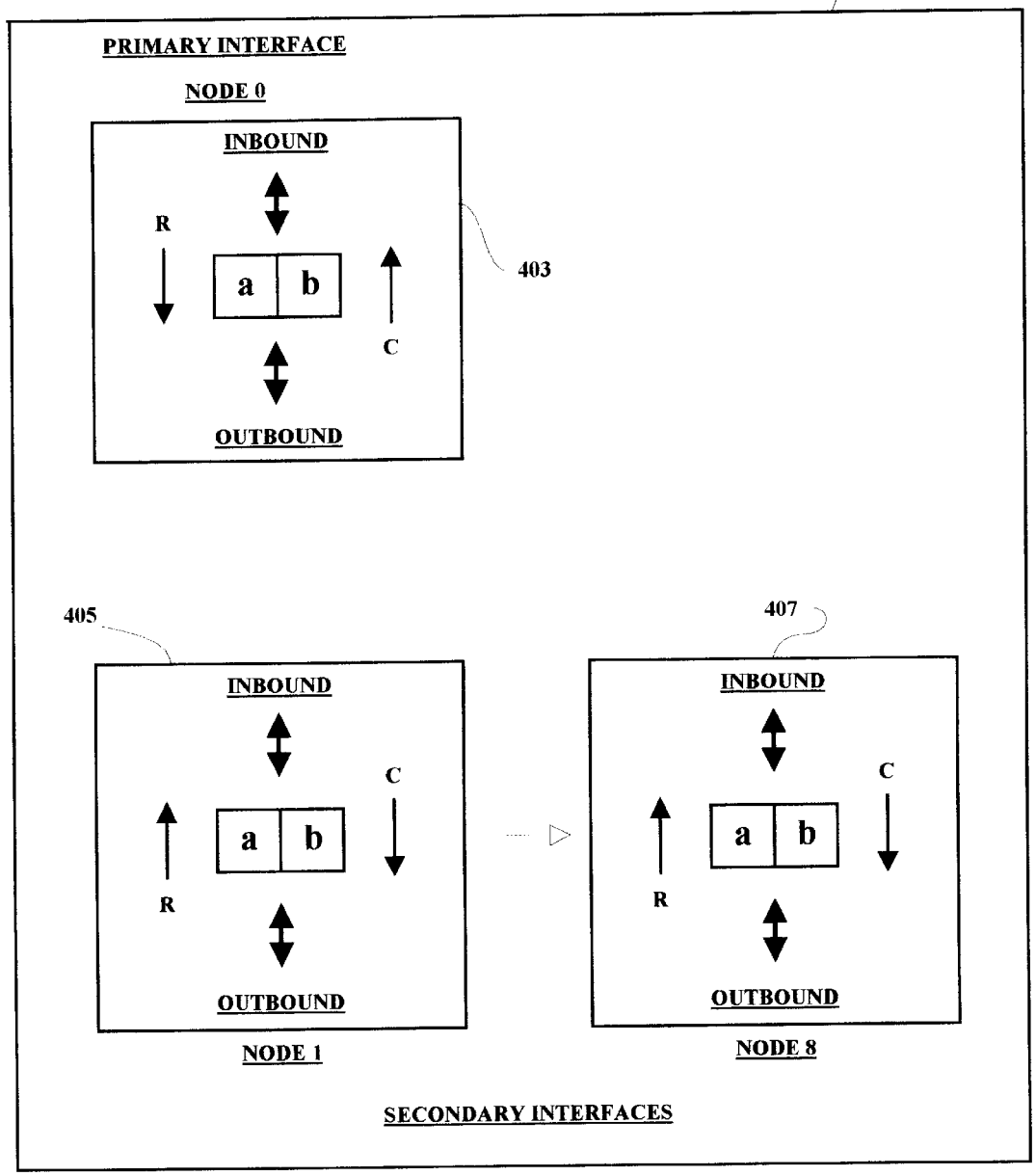
FIG. 4 is a schematic diagram illustrating an operation of the buffers within the exemplary PCI-PCI bridge circuit.

FIG. 4 illustrates a new buffer definition as contained in the exemplary embodiment of a PPR circuit 401 as herein disclosed. The PPR 401 includes a primary interface at node "0" and secondary interfaces at a plurality of secondary nodes 405–407, from Node 1 to Node 8, respectively. In the present example there are eight secondary nodes coupled to eight PPR secondary PCI busses. The primary interface has a buffer arrangement 403 which includes buffers "a" and "b". Also, each of the secondary nodes includes buffers "a" and "b". In FIG. 4, "R" indicates request transactions and "C" indicates completion transactions. In the exemplary embodiment, a "renaming" protocol or methodology is implemented wherein an inbound (i.e. into the PPR 401) Delayed Request (i.e. a delayed read or a delayed write) transaction buffered at a node, upon completion at the target node, remains in the same buffer, but is updated (with data and/or status) and "renamed" a Delayed Completion transaction awaiting the originating master to repeat the same transaction (previously Retried). When the originating master repeats the original transaction, a Delayed Completion transaction stored in a buffer "completes" at the requesting node and the subject buffer is made available for another transaction. In this manner, for the PPR multi-node bridge 401, for a given buffer set at a specific node, the buffers can contain inbound requests, i.e. into the PPR, which can be targeting any of the other nodes, or a combination of inbound requests and outbound delayed completions which are flowing in opposite directions.

The PPR 401 thus provides a different technique of buffer definition compared to standard PCI-PCI bridges, and also includes different buffer management protocols. For example, in a PCI Standard 2.1 bridge, each set of buffers in the bridge contains transactions that are all going in the same direction. Requests and Completions are stored in different buffers. In the disclosed PPR or router bridge 401, each buffer set can contain requests that are going in the same direction, completions that are going in the same direction, or a mix of requests and completions that are going in different directions. With this arrangement, if only one device is attached below a secondary interface on a PPR, added "combining" (see PCI Specification 2.2 for description of "combining") can be accomplished since other masters will not interfere with the combining, which will yield added performance. Also with the "renaming" methodology, the delayed request does not have to be moved to a buffer in the opposing path when converted to a completion transaction thereby allowing a simpler state machine and more efficient buffer management.

Figure 5:
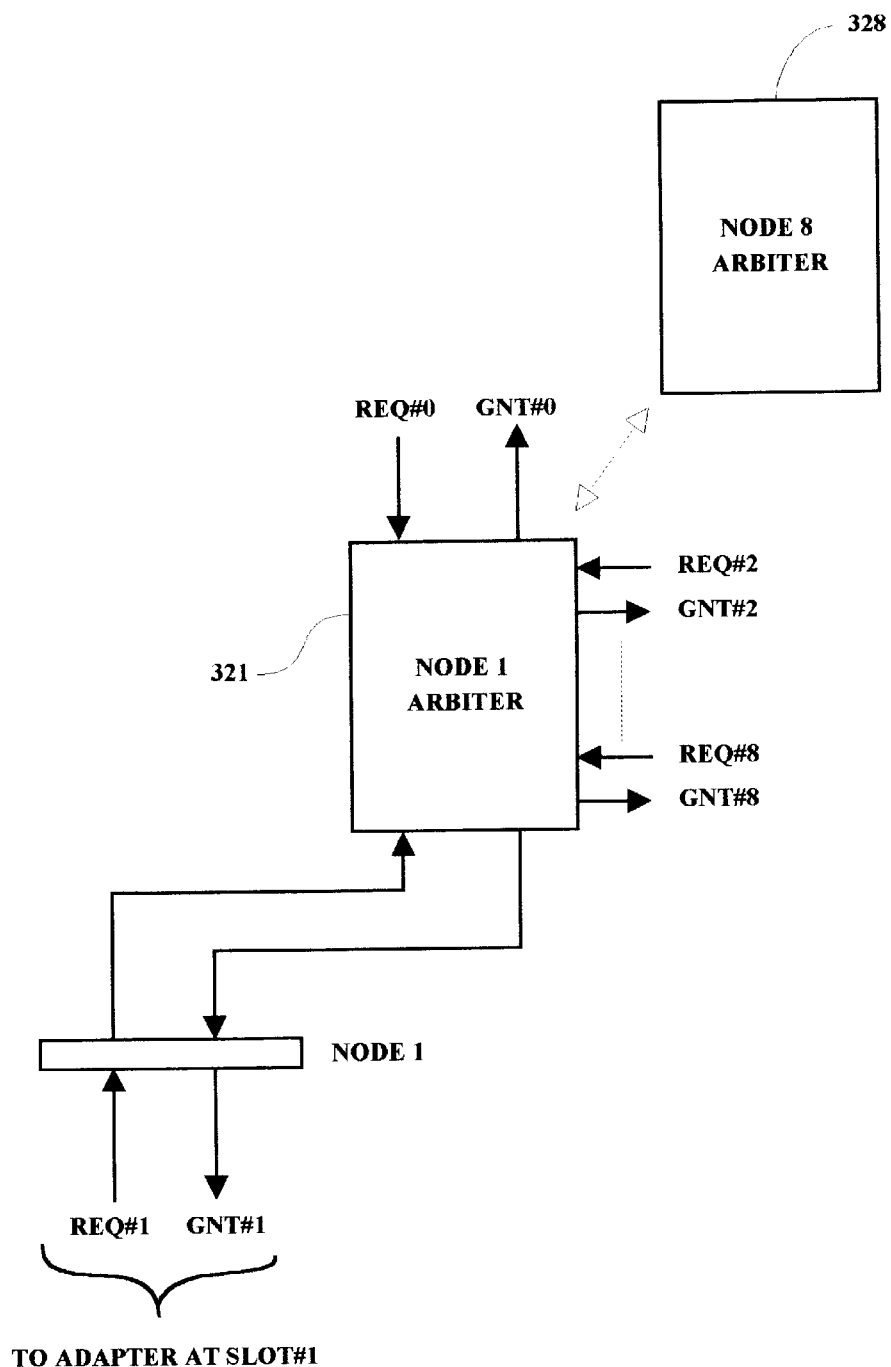
FIG. 5 is an illustration useful in explaining an exemplary arbitration implementation for the multi-node PCI-to-PCI bridge (PPB) circuit.

In FIG. 5, there is shown a Node 1 arbiter 321 which is connected to request (REQ#1) and grant (GNT#1) lines from an adapter mounted in slot number 1 of the first of eight PCI busses in the present example. As illustrated, there is one arbiter circuit 321–328 associated with each of the eight nodes in the present PPR example. Each node arbiter circuit in the PPR is arranged to arbitrate requests from and provide grants to internal requests originating from each of the eight nodes (including from the primary node and seven other secondary nodes) of the PPR 117 as well as relative to each of the adapters on any given PCI bus. The bridge state control 311 and transaction ordering rules 315 also handle the PCI architecture requirement that a posted memory write (PMW) must be allowed to bypass a read request. The arbiters in the example are arranged to implement a fair round-robin scheme, and to handle unique PCI switch ordering requirement that a PMW from slot "X" must be allowed to bypass a read request from slot "Y" when both requests have a destination of slot "Z", i.e. the same target. Read Requests or Read Completions are tagged as having to "push" previous PMWs ahead of them. FLUSH requests are given priority by the Arbiters 329 in the implemented fairness methodology since they must complete ahead of such tagged read transactions. PMWs in a "flush state" (which implies an interrupt pending or a read completion causing a PMW to be flushed) are prioritized. A PMW FLUSH can be caused by either a Delayed Read Request or a Delayed Read Completion that is tagged as required (by PCI ordering rules) to push the PMW ahead of it.

As hereinbefore noted, the bridge buffers in the PPR 117 allow for temporary storage of transaction related information requests and completions using the same buffer by re-naming that particular buffer when request completion information is provided. In order to implement the disclosed system in which allow any node buffer to be used for both requests and completions, a specific set of ordering rules has also been implemented. These ordering rules are set forth in FIG. 6. The rules allow the PPR to meet PCI ordering rules and also support peer-to-peer and IOP operations from any node to any other node. The table illustrated in FIG. 6 illustrates the combination of transactions that can be resident in buffers "A" and "B" at any given node, and also what action is taken if another transaction request is received at that node and whether re-ordering of the buffers occurs. As used herein, "re-order" means whether a new prioritization is assigned such that a subsequent transaction in one buffer is allowed to be attempted ahead of the transaction in the other buffer at that node, even though the transaction entered the other buffer first.

In the FIG. 6 table, the following abbreviations are used: "pre" means prefetchable; "npre" means non-prefetchable; "PMW" means posted memory write; "DRR" means delayed read request; "DWR" means delayed write request; "DRC" means delayed read completion; and "DWC" means delayed write completion. The reference numerals in the table of FIG. 6 refer to the following notes which are helpful in explaining the operation of the re-order rules implemented in the exemplary embodiment relative to the specific situation defined in the referring line of table:

1. Both operations are allowed to pass that are going in opposite directions. PMW from node X to node Y are also allowed to pass Delayed Completions buffered at destination node Y;
2. Whichever master comes back first on the source bus will get data first;
3. YES if the DRR or DWR was received first, then on a destination bus after the delayed transaction has been attempted at least once, then re-order the buffers (move the PMW ahead of the DRR/DWR. No re-ordering is made if the PMW was received first;
4. Discard DRC-pre in buffer first (but after DRC-pre timer has expired) discard time cannot be too high since it can stall acceptance of PMW;
5. DRC from node X buffered at node Y are not allowed to complete at node Y until PMWs previously buffered at node X are flushed (regardless of the destinations of the PMWS);
6. DRC and DWC from node X must be allowed to pass DRR and DWR from node X to prevent deadlocks;
7. Another possible implementation allows mix of transaction to different nodes in buffers along with PMW to node X;
8. It is possible to discard a previous DRR to free-up a buffer provided the DRR has not yet been attempted on the target node. The preferred embodiment is not to discard DRRs but to discard DRC if needed as long as it is to prefetchable memory.

With two buffers per node as illustrated in the exemplary embodiment, at least one buffer (not restricted to either buffer A or buffer B) must be available for use by posted memory write requests. This is to meet the PCI requirement that a device must always be capable of accepting posted memory write requests to avoid deadlocks. The PCI Specification 2.2 requires that some PCI transactions be allowed to bypass other PCI transactions to avoid deadlocks. For all of the combinations listed in the first two columns of FIG. 6, the corresponding actions listed in the third and fourth columns meet the requirements for both non-peer-to-peer operations and also for peer-to-peer and IOP support. Also certain PCI transactions are not allowed to bypass other PCI transactions to allow adapters or device drivers to assure data consistency following an interrupt. The actions listed in the third and fourth columns meet those requirements for both non-peer-to-peer operations and also for peer-to-peer and IOP support.

Additional PCI bridge/router ordering rules that the PPR follows to assure proper transaction ordering and deadlock-free operation include the following: (1) PMW through node X must be allowed to pass DRR and DWR through node X—a node must be able to accept PMW (except for the temporary condition of having the write buffers full) to avoid deadlocks; (2) PMW through node X must be allowed to pass DRC and DWC buffered at node X and at the destination node a node must be able to accept PMW (except for the temporary condition of having the write buffers full) to avoid deadlocks; (3) PMW must not pass PMW—writes through a node must remain ordered regardless of destination nodes of the writes; (4) DRR must not pass PMW—read requests through a node must push writes regardless of destination nodes of the reads and writes; (5) DWR must not pass PMW—writes through a node must remain ordered regardless of destination nodes of the writes; (6) DRC must not pass PMW—read completions from node X must pull writes from node X regardless of write destination node; (7) DRC and DWC from node X must be allowed to pass DRR and DWR from node X to avoid deadlocks; (8) All other delayed transactions are not required to be ordered relative to each other and will be processed in the order received; (8) Transactions between any two given nodes are non-blocking and have no ordering requirements relative to transactions between any other two nodes and may occur simultaneously.

In the present example, there are two buffers "A" and "B" per node within the PPR, as shown in FIG. 2 and FIG. 4. In operation, information transactions are initiated with read requests and write requests which may be generated by adapters or devices connected to a PCI bus and acting as master devices, and directed to a designated target device. Thus, transaction requests may be coming from CPUs to target adapter devices connected to a PCI bus, or the transaction requests may be coming from adapters on a PCI bus acting as master devices and directed to designated target devices within the system, including system memory and/or other adapters on other PCI busses in the system. In the exemplary embodiment, there are illustrated eight different secondary PCI busses and each PCI bus may have one or more PCI adapters connected to PCI slots on that PCI bus. The transaction requests may be generated by any of these adapters acting as a master device, and be "targeted" for any other adapter on any other PCI bus, as well as system memory. The buffers in the PPR 117 function to hold the request information in temporary storage while access to the next station along the path to the designated target is obtained. Further, after requested information is obtained, that "completion" information is returned to the requesting device and temporarily held in the buffers until, for example, access to the PCI bus containing the requesting adapter is arbitrated and obtained so that the temporarily stored completion information can be returned to the requesting adapter. When the return can not be completed as a continuous process (such as when access to the PCI bus is not immediately available because the bus is being used in another transaction), the return of the completion information is designated as a "delayed completion" and the information is held in the buffers until the originally requesting master device retries the original request.

In the present example, there are two buffers per node or path. This arrangement enables designated transactions to be able to bypass earlier generated transactions under certain conditions. When a transaction arrives and there is a request for buffer use at a buffer pair, that transaction is stored in one of the two buffers in the pair. When both buffers are empty, the transaction information can be stored in either buffer. The table of FIG. 6 illustrates the methodology of buffer ordering given the states of the buffers and the type of transaction arriving to the buffer pair as noted. It is noted that the table describes the reordering of the buffers when the buffers contain the information noted and a new transaction request is received. When both buffers are free or empty, then all transactions are "allowed" as noted in the first line of the table. When both buffers in the example are occupied with transaction information, then arriving transactions such as a delayed requests (DR) and posted memory writes (PMW) are handled as explained in the FIG. 6 table.

The buffer re-ordering methodology (i.e. the methodology by which it is determined whether a new buffer prioritization is assigned such that a subsequent transaction is allowed to be attempted ahead of the transaction in the other buffer at that node, even though the transaction entered the other buffer first) is fully disclosed in FIG. 6 along with the related notes and rules. Several exemplary transactions in the table are here discussed in detail in order to illustrate how to use the table to determine a PPR buffer re-ordering operation under a given set of input conditions. For example, as hereinbefore noted, in the first line of the table, when both buffers are free, all new commands are allowed and the re-ordering of buffers is not applicable (N.A.). In line 4, when buffer B contains non-prefetchable delayed read completion information (DRC-NPRE) and buffer A is free, then only posted memory write (PMW) transactions are allowed and all others are issued a RETRY (as defined in the above referenced PCI Specification). Referenced note "5" in the REORDER BUFFERS column states that the delayed read completion from node X buffered at node Y are not allowed to complete at node Y until PMWs previously buffered at node X are flushed or removed, regardless of the destinations of the PMWs. Further, referenced note "6" in line 4 of the table of FIG. 6 states that the DRC and DWC from node X must be allowed to pass DRR and DWR from node X to prevent deadlocks. In the eighth line of the table, when both buffers are loaded with posted memory write (PMW) information, then when a new request is attempted, a RETRY is effected and there is "NO" re-ordering. In line 12, when buffer A contains a PMW and buffer B contains a DRR, and a new request is attempted, then a RETRY is effected. Referenced note "3" in line 12 states that "YES" (the buffers are to be re-ordered)—if the DRR or DWR was received first, then on a destination bus after the delayed transaction has been attempted at least once, then re-order the buffers, i.e. move the PMW ahead of the DRR/DWR. No re-order is necessary if the PMW was received first. By referring to the FIG. 6 table and the corresponding notes set forth herein, the PPR buffer re-ordering methodology is fully disclosed relative to the stated PPR input conditions.

Transactions to, from, and between adapters on the eight secondary PCI busses are managed through the PPR 117. In order to support peer-to-peer transactions between peer PCI devices on the PCI busses and also in order to support IOP transactions between secondary PCI nodes, and multiple address spaces for outbound or away-from-processor/memory transactions, routing tables, such as routing tables 313 in FIG. 3, are provided. At each node, a set of routing tables is provided that determine the destination of transactions entering the PPR 117 from any node to any other node. The routing tables at each node contain multiple entries for address, length and target node. If a PPR has a total of "n" nodes, including the primary node, then each routing table at each node would contain (n−1) table entries for each address space. For the exemplary embodiment, since there is a total of nine nodes, there would be a total of eight table entries for each address space.

In an exemplary operation, a read request from a first adapter on PCI bus #1 attempts an access to a second adapter attached to PCI bus #8 after the first adapter has gained access to PCI bus #1. If a buffer 307 is available at node 1, the request is accepted and temporarily stored in a buffer 307. The routing table 313 at node #1 determines, based upon the address of the read request, that the request is destined for an adapter at node #8 (PCI bus #8). The arbiter 328 at PCI bus #8, with the arbiter's fairness methodology, will eventually grant the PCI bus #8 to the "internal" read request from node #1 and buffered in buffer 307. The read request will then be attempted on PCI bus #8 through Transaction Routing and Buffer Management 305 and Master function 248 at the bus interface 128.

Without peer-to-peer and IOP support, routing tables would not be needed for inbound transactions (toward system processor/memory) since all inbound transactions could be assumed to be going to the system processor/memory complex. However, in the disclosed system, transactions are able to flow "peer-to-peer" or directly between adapters on different PCI busses for example, without being routed through the system processor/memory complex. By providing independent arbiters 321–328 and routing tables 313 at each node as shown in FIG. 3, the PPR 117 can allow simultaneous performance non-blocking transactions between nodes. For example, transactions flowing between nodes 1 and through PPR 117 are independent of transactions flowing between nodes 3 and 4 through the PPR 117, and therefore can occur in a simultaneous and non-blocking fashion thereby providing higher peak performance and higher net throughput than would be the case for standard PCI-PCI bridges.

Figure 7:
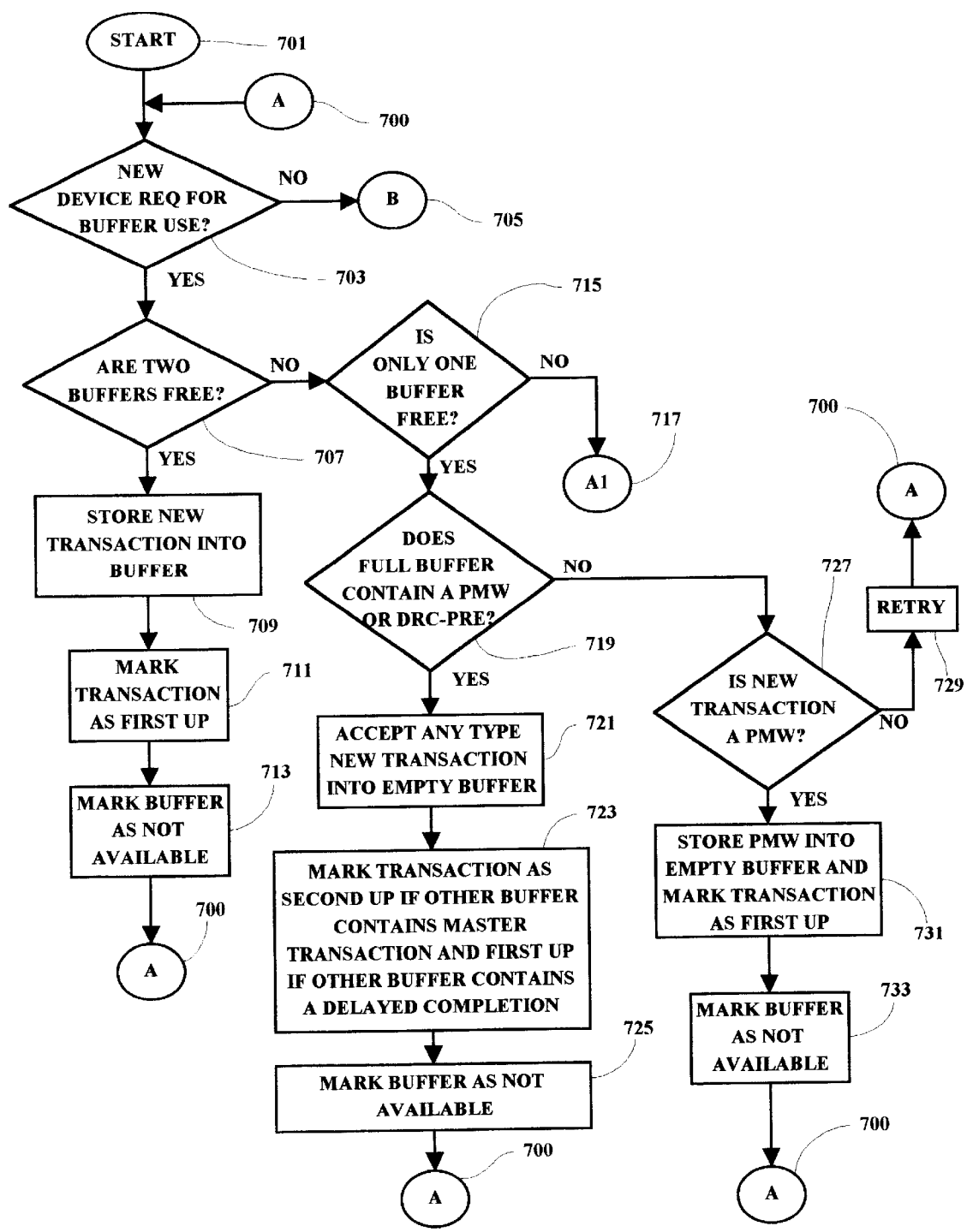
FIG. 7 is a flow chart illustrating an exemplary operational sequence of the PPB.

Referring now to FIG. 7, the methodology for an exemplary operation of the PPR 117 is disclosed. When a new transaction request is received 701 a determination is made 703 as to whether there is a new device request for buffer use. A return point "A" 700 also enters at this point in the flow from other points in the methodology as is hereinafter noted. If there is a request for buffer use, a check is then made to determine if two buffers are free 707. If two buffers are free, then the new transaction is stored 709 into one of the buffers noting its relative time of entry into a buffer pair for reference in subsequent prioritizing of the buffers. The stored transaction is marked as "first-up" 711, meaning it will be the next transaction to be further processed from that set of two buffers. The buffer will be marked as "not available" 713 and the process will return to point A 700 to await the next device request for buffer use 703.

If it is determined that two buffers are not free 707, then a check is made to determine if only one buffer is free 715. If only one buffer is free 715, then a check is made to determine if the full buffer contains a PMW or DRC-PRE 719, and if so, then any type of new transaction is accepted into the empty buffer 721. The transaction is then marked 723 as "second-up" if the other buffer contains a master transaction and "first-up" if the other buffer contains a delayed completion. The buffer is then marked as "not available" 725 and the process returns to point A 700. If, after it is determined that only one buffer is free 715 and the full buffer does not contain a PMW or DRC-PRE 719, then a check is made to determine if the new transaction is a PMW 727. If so, the new PMW is stored into the empty buffer and the transaction is marked as "first-up" 731. The buffer is then marked as "not available" 733 and the process returns to point A 700. If the new transaction is not a PMW 727 then a RETRY is effected 729 and the process returns to point A 700. If it has been determined at block 715 that no buffers are free, then the process continues to point A1 717 on FIG. 8. If it is determined at block 703 that there is no request for use of the buffers, then the process moves to point B 705 which is continued in FIG. 9.

Figure 8:
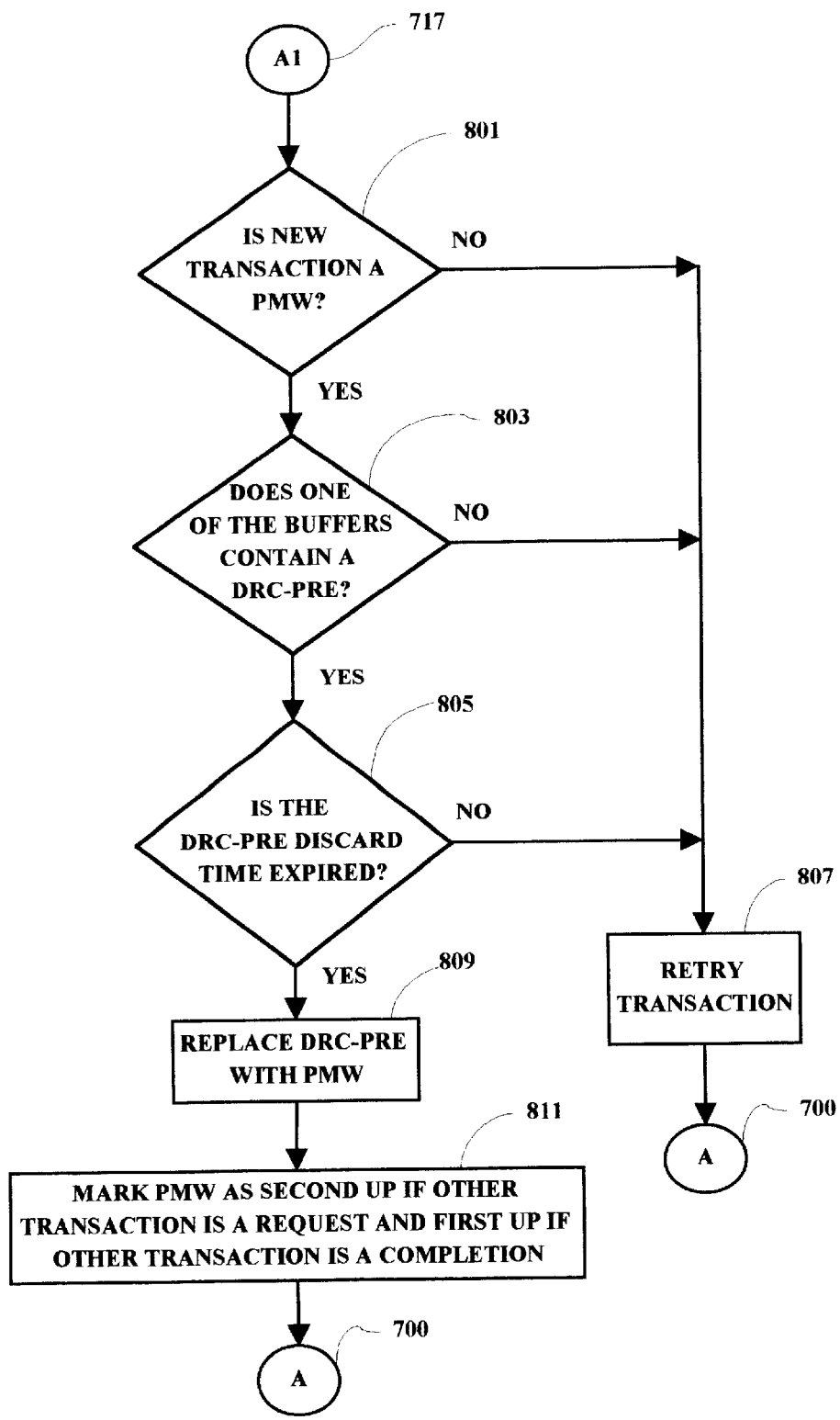
FIG. 8 is a flow chart extension from FIG. 7.

In FIG. 8, from point A1 717, a determination is made as to whether or not the new transaction is a PMW 801. If so, a check is then made to determine if one of the buffers contains a DRC-PRE 803 and if so, whether the DRC-PRE discard time has expired 805. The discard time refers to the fact that delayed read completions (DRCs) are held only for a predetermined amount of time and if they have not been claimed by the requesting master during that time, the DRC can be discarded and has to be again requested by the master device. If the DRC discard time has expired 805, then the DRC-PRE is replaced with the new PMW 809. The PMW is then marked as second-up if the other transaction is a request and first-up if the other transaction is a completion 811. The process then returns to point A 700. If the new transaction is not a PMW 801 or if one of the buffers does not contain a DRC-PRE 803, or if the DRC-PRE discard time has not expired 805, then a RETRY is effected 807 and the process returns to point A 700.

Figure 9:
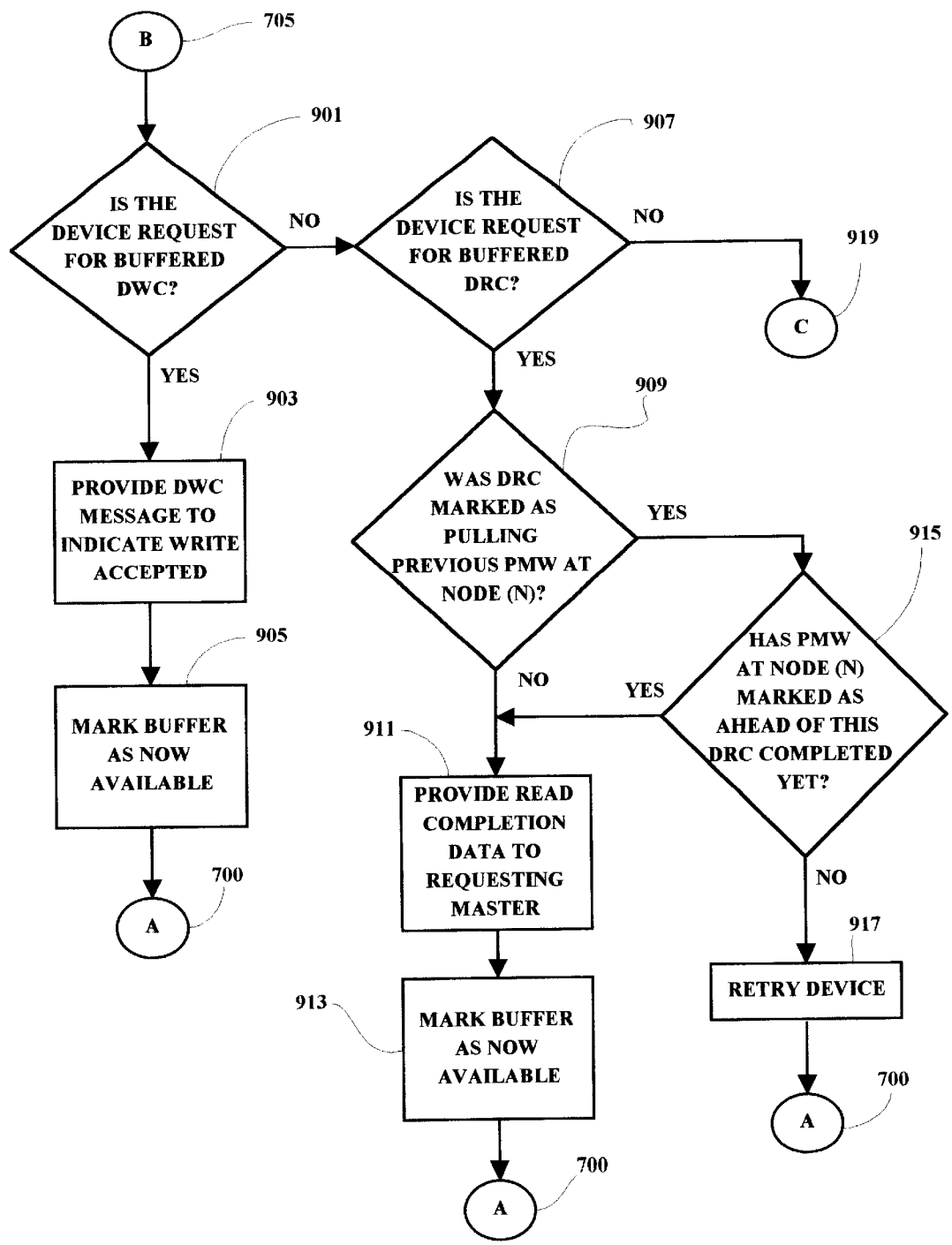
FIG. 9 is a flow chart extension from FIG. 7.

In FIG. 9, the flow chart of FIG. 7 is continued beginning at point B 705. A determination is made as to whether the device request is for a buffered DWC 901, and if so, a message is provided to indicate that the DWC is accepted 903, the buffer is marked as available 905 and the process returns to point A 700. If the device request is not for a buffered DWC 901, then a check is made to determine if the device request is for a buffered DRC 907. If the request is for a buffered DRC 907 then a check is made to determine if the DRC is marked as pulling a previous PMW buffered at the node (N) from where the DRC data came 909. This satisfies a PCI ordering rule that DRCs are not allowed to bypass a PMW. If the DRC is so marked 909, then a check is made to determine if there was a PMW at node (N) marked as ahead of the current DRC and which has completed 915. If not, a RETRY is effected 917 and the process returns to point A 700. If there was a PMW marked ahead of the DRC 915 and it has completed, or if the DRC is not marked as pulling a previous PMW 909, then the read completion data is provided to the requesting master 911, the buffer is marked as available 913 and the process returns to point A 700. If the device request is determined to be not for a buffered DRC 907, then the process continues to point C 919.

Figure 10:
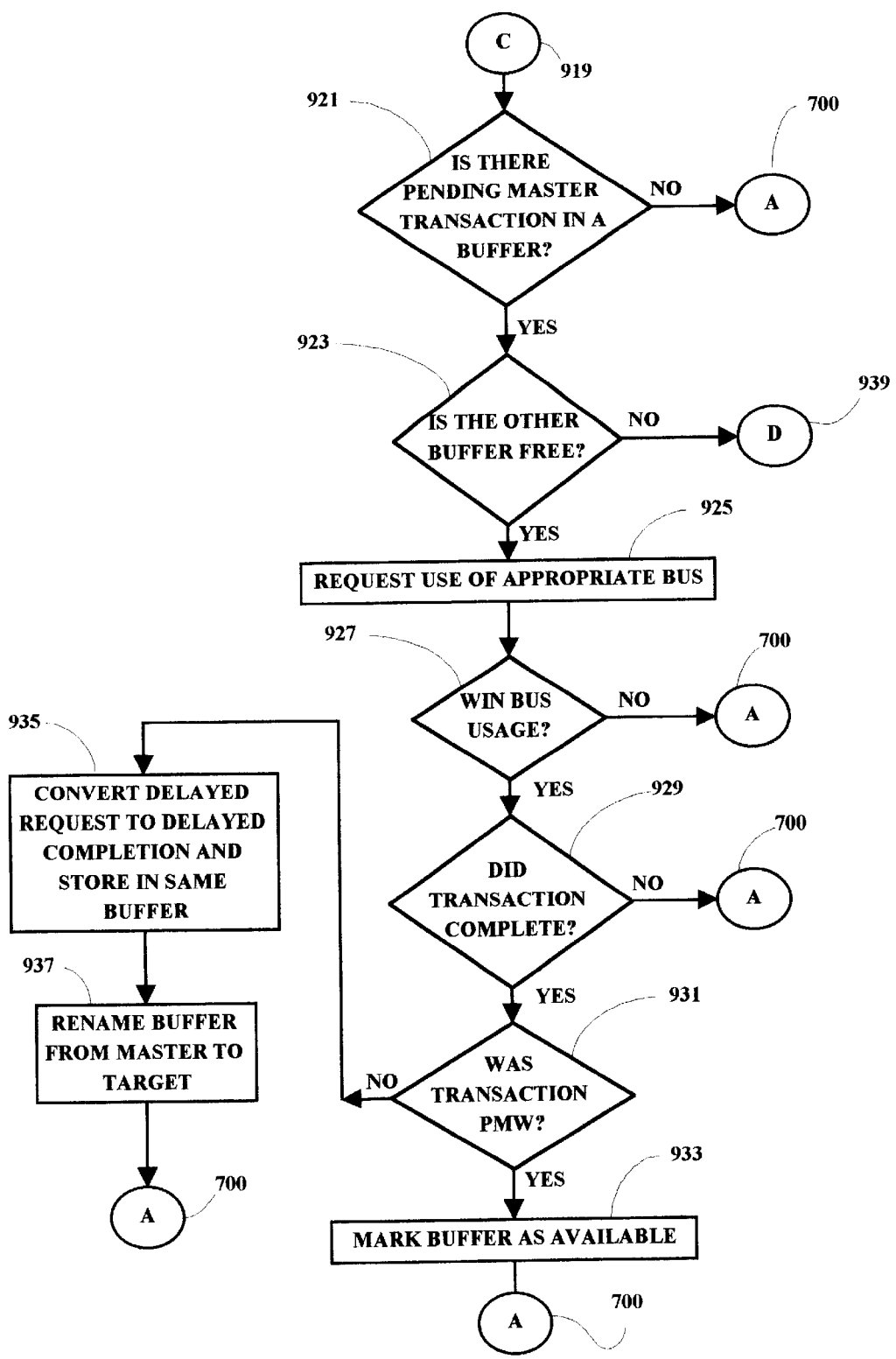
FIG. 10 is a flow chart extension from FIG. 9.

As shown in FIG. 10, from point C 919, a check is made to determine if there is a pending master transaction in a buffer 921, and if so, then a determination is made if the other buffer is free 923. If there is no pending master transaction in a buffer 921, the process returns to point A 700. If there is a pending master transaction but the other buffer of a buffer pair is not free 923, then the process continues to point D 939. If, however, the other buffer is free 923, then a request to use the appropriate bus is made 925. If the arbitration for the bus usage results in a win 927, a check is made to determine if the transaction completes 929 and if so, a determination is made as to whether the transaction was a PMW 931. If the transaction was a PMW 931, then the buffer is marked as available 933 and the process returns to point A 700. If the bus arbitration for bus usage is not won 927, or if the transaction did not complete 929, then the process also returns to point A 700. However, if the transaction completed 929 but the transaction was not a PMW 931 then the delayed request is converted to a delayed completion and stored in the same buffer 935. The buffer is then renamed from containing a master to containing a target transaction 937 and the process returns to point A 700.

Figure 11:
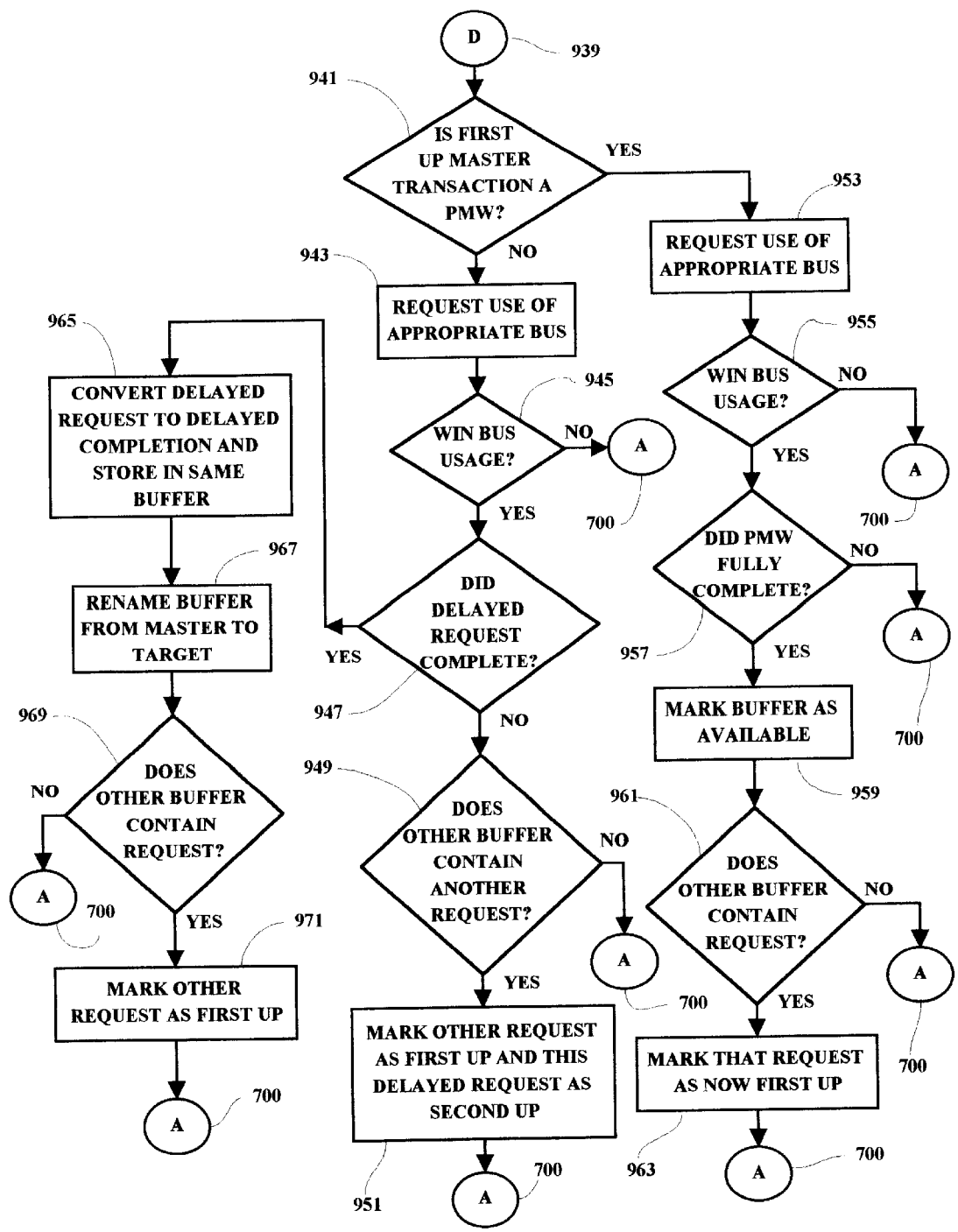
FIG. 11 is a flow chart extension from FIG. 10.

In FIG. 11, the methodology is continued beginning at point D 939. A check is made to determine if the "first-up" master transaction is a PMW 941. If so, use of the appropriate bus is requested 953. If usage is not won 955, the process returns to point A 700. However, if use of the bus is won 955, a check is made to determine if the PMW fully completed 957. If not, the process returns to point A 700. However, if the PMW fully completed 957, then the buffer is marked as available 959 and a determination is made to determine if the other buffer in the buffer pair contains a request 961. If not, the process returns to point A 700. However, if the other buffer does contain a request 961, then that request is marked as "first-up" 963 and the process returns to point A 700.

If it is determined that the first-up master transaction is not a PMW 941, then a request is made to use the appropriate bus 943. If bus usage is not won 945 then the process returns to point A 700. If, however, bus usage arbitration is won 945, then a check is made to determine if the delayed request completed 947 and if so, the delayed request is converted to a delayed completion and stored in the same buffer 965. The buffer is then renamed from a name indicating a containment of a master transaction to a name indicating a containment of a target transaction 967 and a check is made to determine if the other buffer in the buffer pair contains a request 969. If not, the process returns to point A 700. If the other buffer contains a request 969, then the other request is marked as first-up 971 and the process returns to point A 700. If the delayed request does not complete 947, then a determination is made as to whether the other buffer contains another request 949. If not, the process returns to point A 700. If, however, the other buffer contains another request 949, then the other request is marked as first-up and this delayed request is marked as second-up 951. The process then returns to point A 700.

Figure 12:
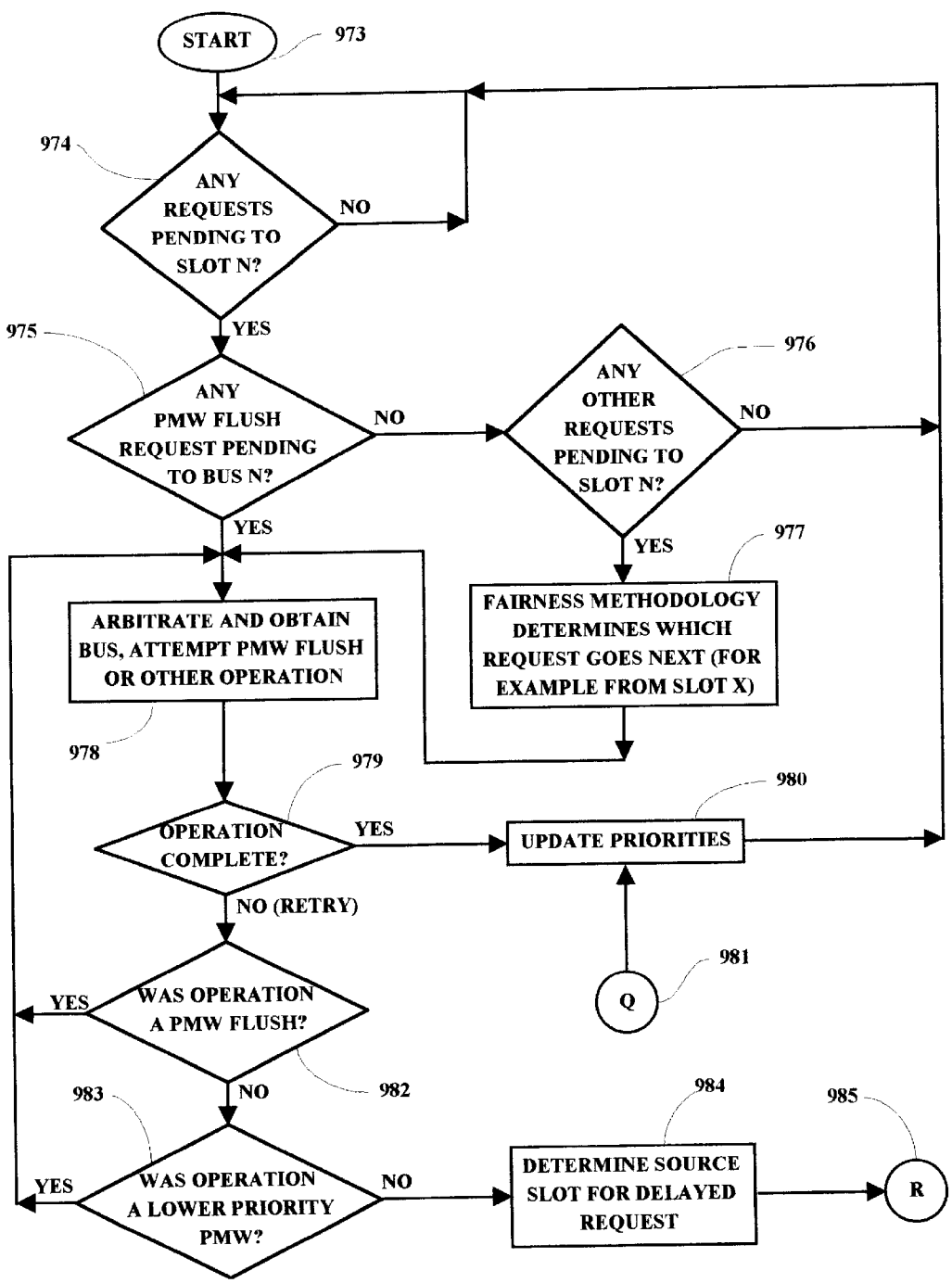
FIG. 12 is a flow chart illustration of an arbiter methodology implemented in the exemplary PPB.

In FIG. 12, the Arbiter methodology starts 973 and makes a determination of whether any requests are pending to slot N 974. If a request is determined to be pending, a check is made to determine if there are any PMW FLUSH requests pending to slot N 975. If there are no PMW FLUSH requests pending 975, then a check is made to determine if there are any other requests pending for slot N 976, and if not, the process returns to check for pending requests in the next slot 974. If other requests are pending 976, the arbitration methodology determines which request goes next 977. Next, an arbitration is effected and when the appropriate bus is obtained, the PMW FLUSH or other operation is attempted 978. A check is then made to determine if the operation completed 979, and if so, the transaction priorities are updated 980 and the process returns to check for other pending requests 974. The "Update Priorities" block also receives a return flow from point "Q" 981 in FIG. 13 as is hereinafter explained. If the operation did not complete and there is a RETRY 979 then a check is made to determine if the operation was a PMW FLUSH 982. If so, the process returns to step 978 to arbitrate for the bus and attempt the PMW FLUSH. If the operation was not a PMW FLUSH 982, then a check is made to determine if the operation was a lower priority PMW 983, and if so, the process then returns to step 978. If the operation was not a lower priority PMW 983, then the source slot for the delayed request is determined 984 and the process continues to point "R" 985 on FIG. 13.

Figure 13:
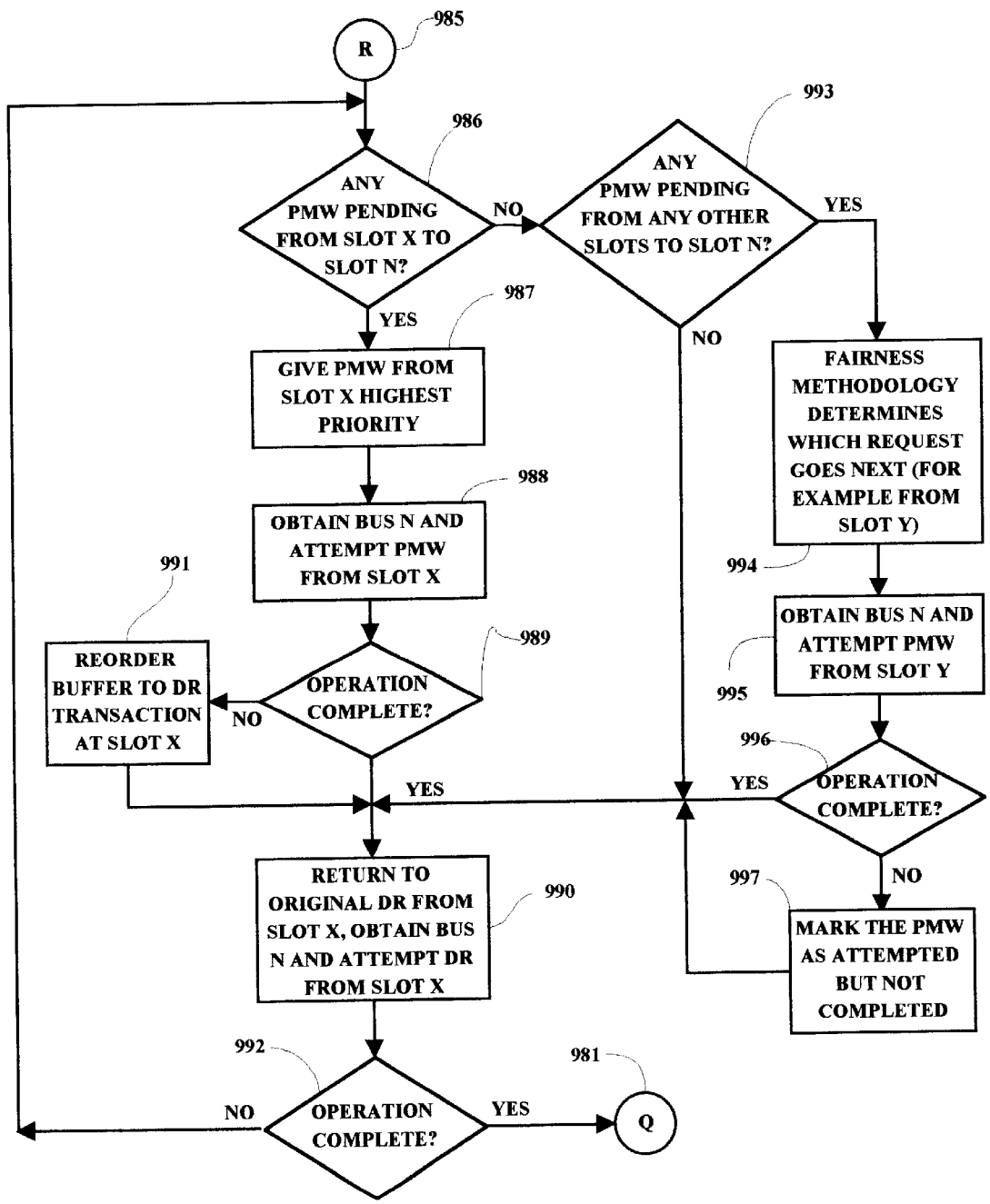
FIG. 13 is a continuation of FIG. 12.

In FIG. 13, from point "R" 985 the arbitration process checks to determine if there is any PMW pending from slot X to slot N 986. If so, the PMW from slot X is given the highest priority 987, bus N is obtained and the PMW from slot X is attempted 988. A check is then made to determine if the operation was completed 989, and if so, the process returns to the original DR from slot X, obtains the bus N, and attempts the DR from slot X 990. If the operation does not complete 989, the buffer is re-ordered to a DR transaction at slot X 991 before returning to the original DR 990. A check is then made to determine if the operation completed 992, and if so, the process returns to point Q 981 which continues to update priorities 980 as shown in FIG. 12. If the process did not complete 992, then the method returns to check for any pending PMW from slot X to slot N 986. If there is no pending PMW from slot X to slot N 986, then a check is made to determine if there is any PMW pending from any other slot to slot N 993, and if not, the process moves directly to block 990. If there is a PMW pending from any other slot to slot N 993, then the Fairness methodology determines which request goes next (e.g. from slot Y) 994, obtains the bus N and attempts the PMW from slot Y 995. If the operation completes 996, the process moves to block 990. If the operation does not complete 996, then the PMW transaction is marked as attempted but not completed 997 before moving to block 990 to return to the original DR from slot X, obtain the bus N and attempt the DR from slot X.

Figure 14:
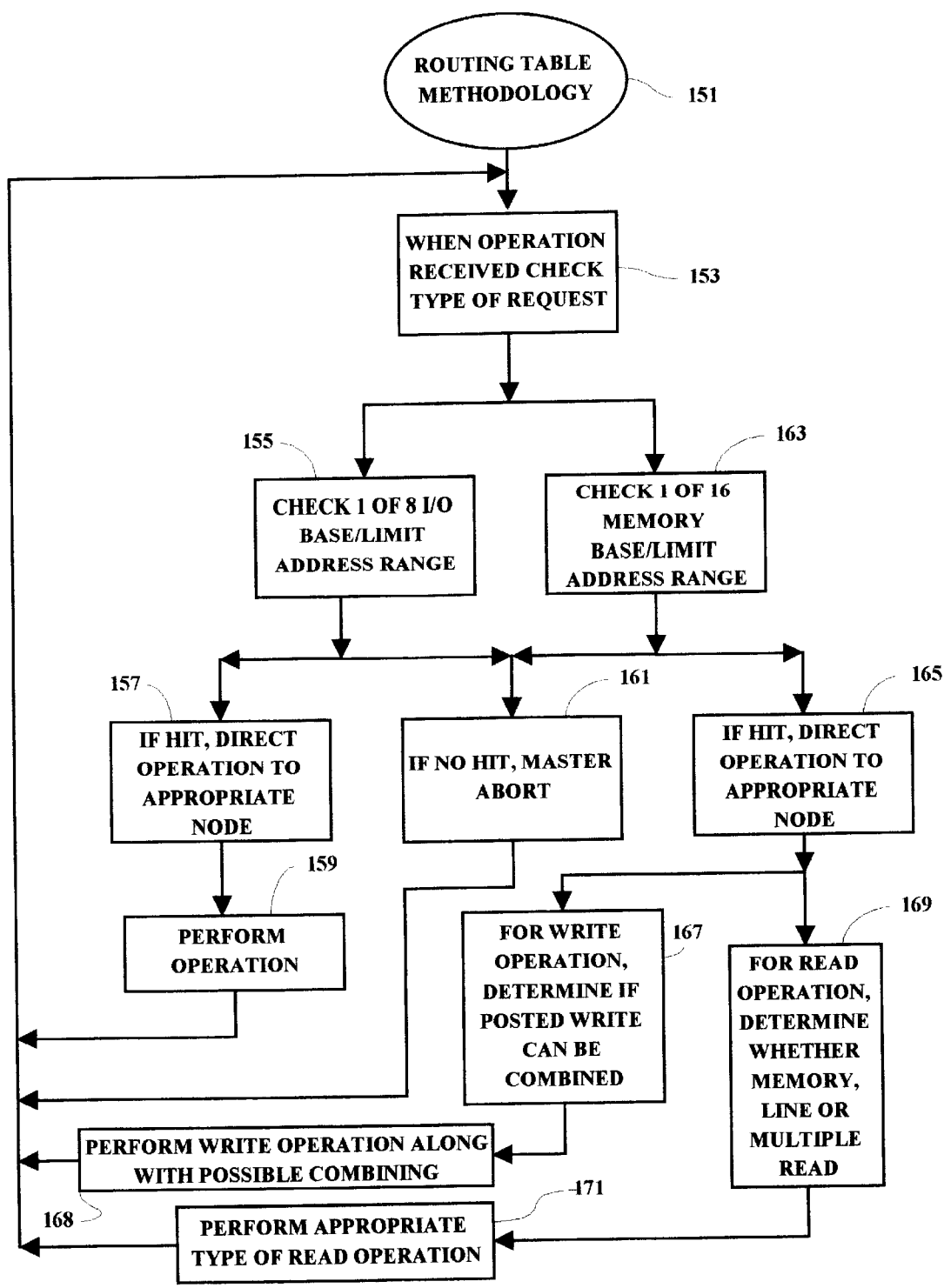
FIG. 14 is a more detailed illustration of the transaction routing methodology implemented in the exemplary PPB.

FIG. 14 shows a flow chart for an exemplary implementation of the routing table methodology. When an operation is received at the PPR at a given node, the methodology 151 first determines the type of request 153, I/O or memory. Next, the base limit address ranges of the I/O or memory requests are checked 155, 163 as applicable. If there are no hits, the bridge is not selected (does not respond with DEVICE #) and therefore a master abort function is effected 161 by the adapter, and the process returns to check for the next received operation 153. If there is a hit in one of eight base/limit I/O address range 155 by an I/O operation, then the address is within a valid address range within the routing table which identifies the target node, and the operation is then directed to the appropriate node 157 by using the routing tables, the operation is performed 159 and the process returns to check for the next received operation 153. If there is a hit in one of sixteen base limit memory address range 163 by a memory operation, then the address of the access is a valid address in the routing table and the operation is directed to the appropriate node 165 indicated by the Table and the process is continued depending upon whether the requested operation is a read or a write operation. For a memory write operation, it is determined if the posted write can be combined with a previous write 167 depending upon whether the new memory write is contiguous with the previous buffered write. The write operation is then performed along with the combining operation if applicable 168, and the process returns to check for receipt of a request for another operation 153. For a memory read operation, it is determined whether the request is a "Read", "Read Line" or "Read Multiple" operation 169, and the specific type of read operation is performed 171 before the process returns to check for the next operation request 153. In this manner the routing tables are implemented to enable transaction routing for the PPR 117.

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other system integrated circuit or chip. The disclosed methodology may also be implemented solely or partly in program code stored on a disk or diskette (portable or fixed), or other memory device, from which it may be executed to achieve the beneficial results as described herein. Accordingly, the present invention is not intended to be limited to the specific example set forth herein, but on the contrary, it is intended to cover such alternatives, modifications, and equivalents, as can be reasonably included within the spirit and scope of the invention.

What is claimed is:

1. A method for processing at least first and second information transfer related transactions through a buffer circuit to determine which of said information transfer related transactions is first up for output from said buffer circuit, said buffer circuit including at least first and second buffer devices, said method comprising:

making an initial determination that there is a processing request to process a new transaction through said buffer circuit;

if both first and second buffer devices are free, then effecting a first process comprising:
storing said new transaction into one of said buffer devices;
marking said one of said buffer devices as first up; and
marking said one of said buffer devices as not free; however, if said first buffer device is free and said second buffer device is full, and if said full buffer device does not contain a posted memory write transaction or a prefetch delayed read completion transaction, and if said new transaction is a posted memory write transaction, then said method effecting a second process comprising:
storing said new transaction into said free buffer device;
marking said new transaction as first up; and
marking said free buffer device as not available.

2. The method as set forth in claim 1 and further including returning to said step of making a determination that there is a processing request after said step of marking said buffer device as not free.

3. The method as set forth in claim 1 and in said second process, if said new transaction is not a posted memory write transaction then said second process being operable for effecting a Retry of said new transaction.

4. The method as set forth in claim 1, except that if said first buffer device is free and said second buffer device is full
and if said full buffer contains a posted memory write transaction or a pre-fetch delayed read completion transaction, then said method further including:
accepting said new transaction into said free buffer device;
marking said new transaction as second up if said full buffer device contains a master transaction, and marking said new transaction as first up if said full buffer device contains a delayed completion transaction; and
marking said free buffer device as not available.

5. The method as set forth in claim 1 except if both said first buffer device and said second buffer device are full
and said new transaction is a posted memory write transaction
and said first buffer devices contains a prefetched delayed read completion transaction
and a discard time for said prefetched delayed read completion transaction has expired, then said method further including:
replacing said prefetched delayed read completion transaction in said one buffer device with said posted memory write transaction; and marking said posted memory write transaction as second up if a transaction stored in said second buffer device is a request transaction, and marking said memory write transaction as first up if a transaction stored in said second buffer device is a completion transaction.

6. The method as set forth in claim 1 and if both said first buffer device and said second buffer device are full, and said new transaction is not a posted memory write transaction then said method further including
effecting a Retry for said new transaction.

7. The method as set forth in claim 1 and if both said first buffer device and said second buffer device are full,
and if said new transaction is a posted memory write transaction, and if said first buffer device does not contain a prefetched delayed read completion transaction
then said method being further operable for effecting a Retry for said new transaction.

8. The method as set forth in claim 1 and if both said first buffer device and said second buffer device are full, and if said new transaction is a posted memory write transaction and if said first buffer device contains a prefetched delayed read completion transaction, and if a discard time for said prefetched delayed read completion transaction has not expired, then said method being further operable for effecting a Retry for said new transaction.

9. The method as set forth in claim 1 except that if it is determined that there is not a processing request to process a new transaction through said buffer circuit, then said method further includes:
determining that there is a request to process a buffered delayed write completion, said delayed write completion being buffered in said first buffer device;
providing a delayed write completion message to indicate acceptance of the delayed write completion; and
marking said first buffer device as now available.

10. The method as set forth in claim 1 except that if it is determined that there is not a processing request to process a new transaction through said buffer circuit, then said method further includes:
determining that a device request is not a request to process a buffered delayed write completion;
determining that a device request is for a delayed read completion buffered in said first buffer device;
determining that said delayed read completion was not marked as pulling a previous posted memory write transaction at a designated node N;
providing read completion data to a designated requesting master; and
marking said first buffer device as available.

11. The method as set forth in claim 10 except that after determining that a device request is for a delayed read completion buffered in said first buffer device, said method further including:
determining that said delayed read completion was marked as pulling a previous posted memory write transaction at a designated node N;
determining that the previous posted memory write transaction has completed;
providing read completion data to a designated requesting master; and
marking said first buffer device as available.

12. The method as set forth in claim 11 except that if the previous posted memory write transaction has not completed, then said method further includes:
effecting a Retry of said device request.

13. The method as set forth in claim 1 except that if it is determined that there is not a processing request to process a new transaction through said buffer circuit, then said method further includes:

determining that a device request is not a request to process a buffered delayed write completion;

determining that a device request is not for a delayed read completion;

determining that there is a pending master transaction in said first buffer device and said second buffer device is free;

requesting use of an appropriate bus;

winning bus usage of said appropriate bus; and marking said first buffer device as free if said transaction was a posted memory write transaction.

14. The method as set forth in claim 13 except that if said transaction was not a posted memory write transaction, said method further includes:

converting the delayed request in said first buffer device to a delayed completion and storing said delayed completion in said first buffer device; and renaming said first buffer device from a master to a target.

15. The method as set forth in claim 13 except that if said second buffer device is not free, then said method further includes returning to said step of making a determination of whether or not there is a processing request to process a new transaction through said buffer circuit.

16. The method as set forth in claim 13 except that if said bus usage is not won, then said method further includes returning to said step of making a determination of whether or not there is a processing request to process a new transaction through said buffer circuit.

17. The method as set forth in claim 13 except that if said transaction does not complete, then said method further includes returning to said step of making a determination of whether or not there is a processing request to process a new transaction through said buffer circuit.

18. The method as set forth in claim 13 except that if said second buffer device is not free, then said method further including:

determining that said first up master transaction in a first buffer device is not a posted memory write;

requesting usage of an appropriate bus and winning usage of said appropriate bus;

determining that said delayed request did not complete;

determining that said second buffer device contains a second request; and marking said second request as first up and said delayed request as second up.

19. The method as set forth in claim 18 except that if said bus usage is not won, then said method further includes returning to said step of making a determination of whether or not there is a processing request to process a new transaction through said buffer circuit.

20. The method as set forth in claim 18 except that if said second buffer device does not contain a second request, then said method further includes returning to said step of making a determination of whether or not there is a processing request to process a new transaction through said buffer circuit.

21. The method as set forth in claim 18 except that if said first up master transaction in a first buffer device is a posted memory write, then said method further including:

requesting usage of an appropriate bus and winning usage of said appropriate bus;

determining that said posted memory write fully completed;

marking said first buffer as available;

determining that said second buffer device contains a request; and marking said request as first up.

22. The method as set forth in claim 21 except that if said bus usage is not won, then said method further including returning to said step of making a determination of whether or not there is a processing request to process a new transaction through said buffer circuit.

23. The method as set forth in claim 21 except that if said posted memory write did not fully complete, then said method further including returning to said step of making a determination of whether or not there is a processing request to process a new transaction through said buffer circuit.

24. The method as set forth in claim 21 except that if said second buffer device does not contain a request, then said method further including returning to said step of making a determination of whether or not there is a processing request to process a new transaction through said buffer circuit.

25. The method as set forth in claim 18 except that if said delayed request in said first buffer does complete, then said method further including:

converting said delayed request to a delayed completion and storing said delayed completion in said first buffer device;

renaming said first buffer device from a master to a target;

determining that said second buffer device contains an additional request; and marking said additional request as first up.

26. The method as set forth in claim 25 except that if said second buffer does not contain an additional request, then said method further including returning to said step of making a determination of whether or not there is a processing request to process a new transaction through said buffer circuit.

* * * * *